Patented May 20, 1941

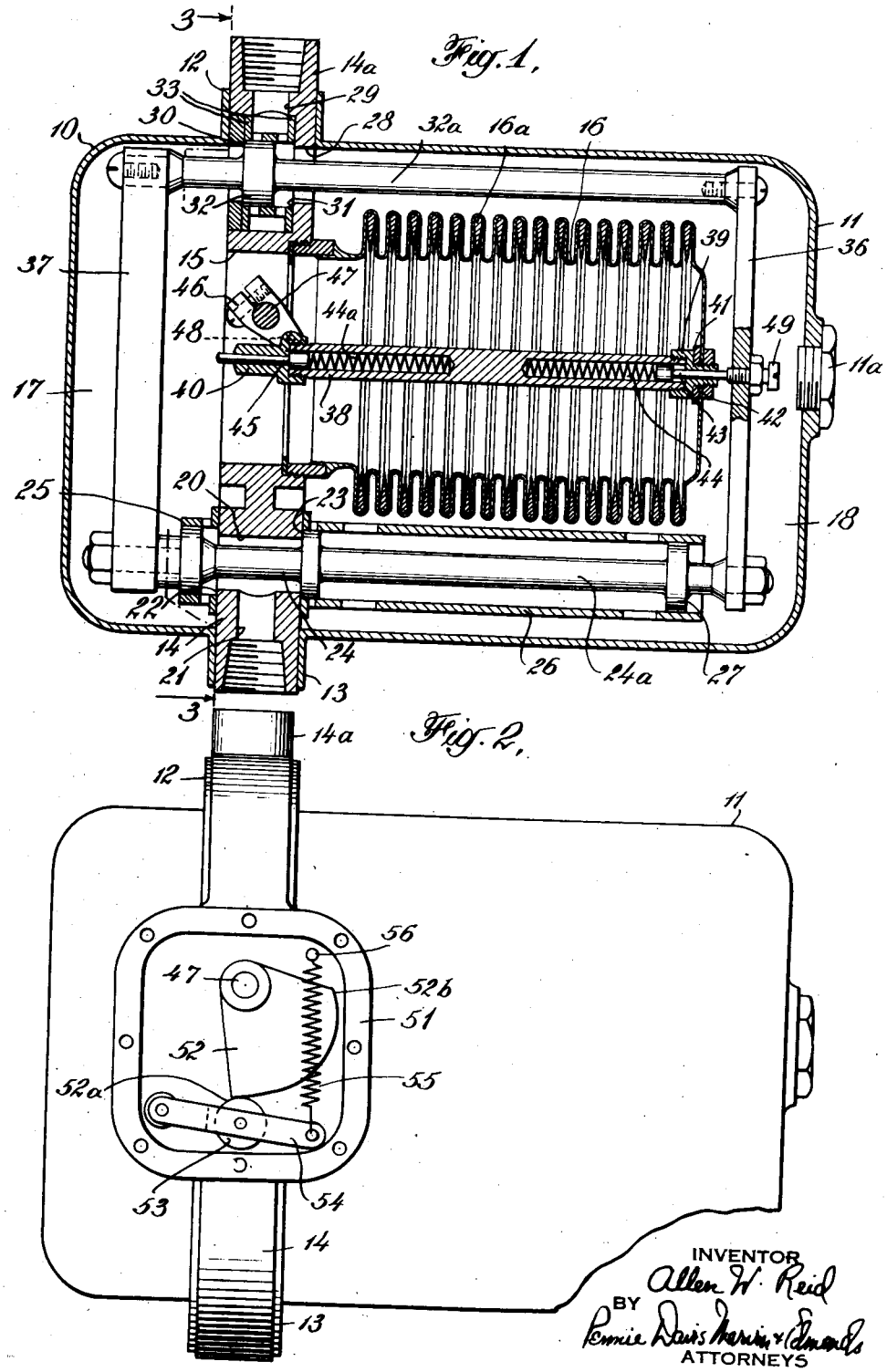

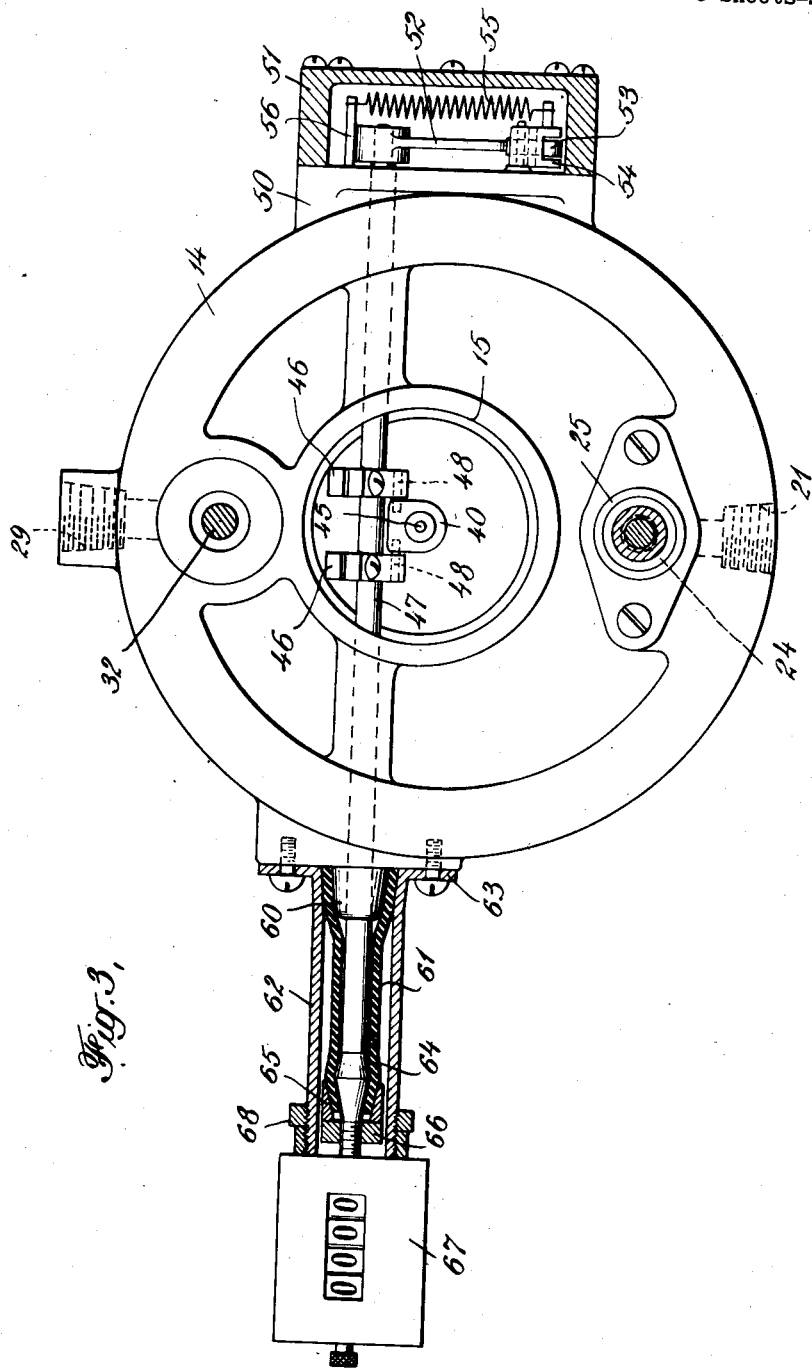

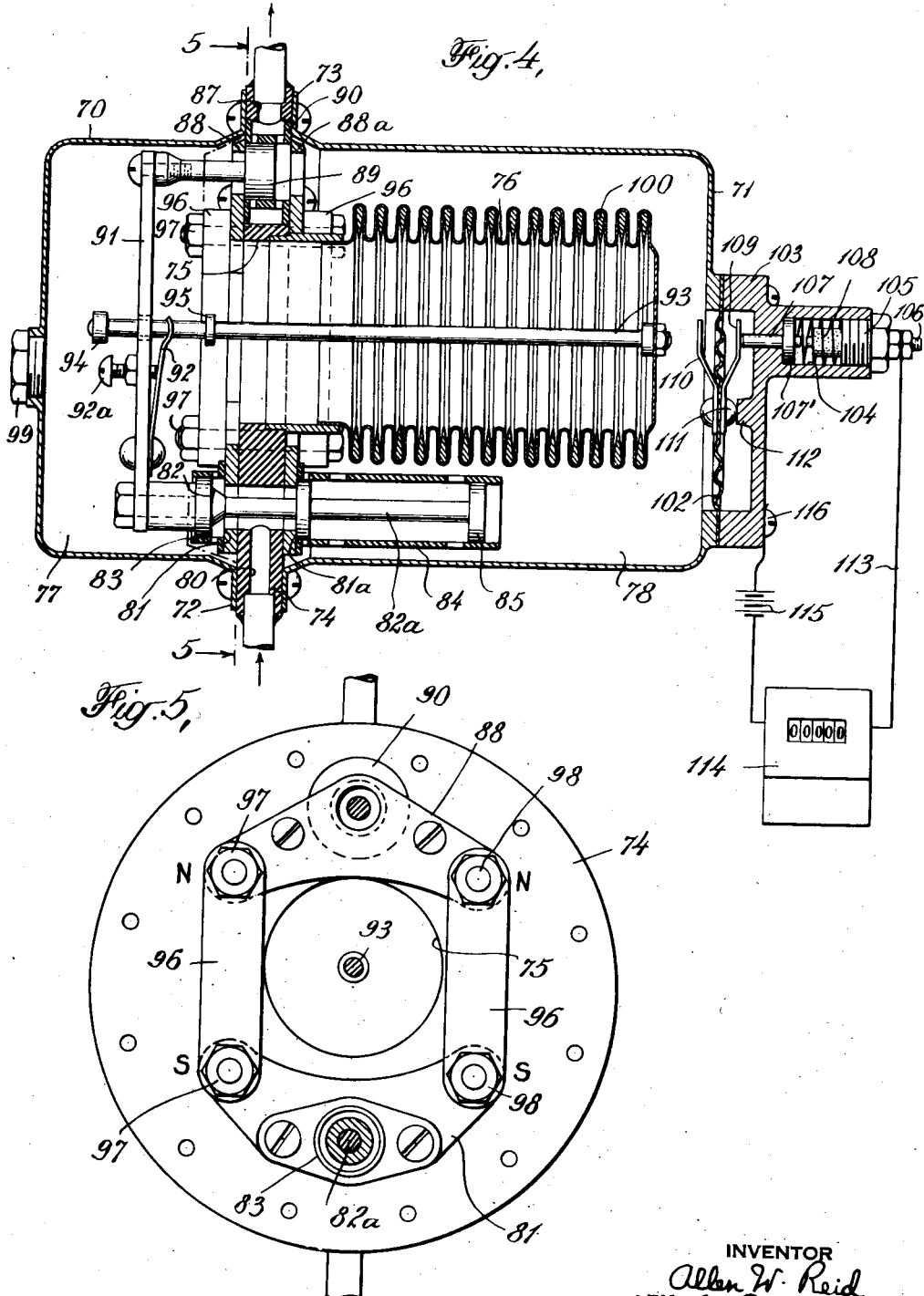

2,242,659

UNITED STATES PATENT OFFICE 2,242,659

FLUID METER

Allen W. Reid, Wyomissing Hills, Pa.

Application June 23, 1939, Serial No. 280,709

14 Claims. (Cl. 73—270)

This invention relates to devices for measuring the flow of fluids and is concerned particularly with a novel fluid meter which requires for its operation only a small amount of energy, obtainable from the fluid flow, and is accurate and reliable in operation. Because of its small power consumption and its accuracy, the new meter may be used to especial advantage in measuring the flow of small amounts of fluid, as for example, the fuel consumption of an internal combustion engine.

Fluid meters have been devised heretofore which comprise a cylinder containing a movable piston serving to divide the cylinder into a pair of chambers, and a suitable valve mechanism controlling the flow into and out of the chambers. In such a meter, the fluid enters one chamber and expands it by moving the piston, whereby the other chamber is contracted and its contents expelled. The valve mechanism is then shifted to connect the expanded chamber to the outlet and direct the incoming fluid into the contracted chamber. This cycle of operations is repeated indefinitely during the measuring operation, and the moving piston acts through suitable means to operate an indicator or recorder.

Such meters, as constructed heretofore, are not highly satisfactory because the piston must be given a tight fit within the cylinder in order to prevent leakage, and movement of the piston therefore requires a considerable amount of power. Also, accuracy of measurement requires exact repetition of the cycle of operations and this depends on rapid and complete movement of the valve mechanism occurring and recurring at identical positions of the piston. In earlier meters of this type, these requirements have not been fulfilled for various reasons and such meters, in many instances, employ delicate mechanisms so that their use is attended with various operating difficulties.

The present invention is accordingly directed to the provision of a fluid meter overcoming the objections to the prior devices, and it includes a novel chamber construction and a new valve mechanism by which the flow of fluid is accurately controlled.

A fluid meter constructed in accordance with the principles of the invention includes a casing subdivided into a pair of chambers by a movable wall in the form of a bellows, preferably of metal, and fluid flow through the meter is under the control of a valve mechanism comprising a pair of valves each movable between a pair of seats. The valves and their seats are of magnetizable material and the mechanism includes means, such as a permanent magnet, which acts to establish a magnetic circuit through each valve and the seat with which it may be in contact. In the operation of the device, fluid entering one chamber compresses or expands the bellows and this in turn causes expulsion of the contents of the other chamber. The bellows in this movement may act through suitable means, such as a spring, to apply a force tending to move the valves from their seats against the magnetic attraction. The spring is weaker than the attracting force and becomes compressed before the bellows starts the valves away from their seats. As soon as the valves have left their seats a small distance, gaps are created between the valves and seats which greatly reduce the magnetic effect, and the force then stored in the spring is effective to move the valves rapidly to their opposite seats. The valves are thus shifted from one set of seats to the other with a snap action and the valves remain in their new positions until the bellows, moving in the opposite direction, has forced the valves from their seats a sufficient distance to break the magnetic circuit and allow a force which has been stored up to complete the valve movement.

The valve mechanism, making use of magnetic attraction and insuring a snap action of the valves, is of general application in meters of the two-chamber type and, therefore, may be employed to advantage in meters in which the two chambers are separated by a piston. The use of the bellows, together with the new valve mechanism, gives the best results, however, because with that construction no inaccuracies arise due to leakage and little power is required for operation.

For a better understanding of the invention, reference may be made to the accompanying drawings in which:

Fig. 1 is a longitudinal sectional view of one form of the new meter;

Fig. 2 is a longitudinal view of the meter with a part thereof removed to show a mechanism for counter-acting the bellows resistance;

Fig. 3 is a sectional view on the line 3—3 in Fig. 1;

Fig. 4 is a longitudinal sectional view of another form of the meter, and

Fig. 5 is a sectional view on the line 5—5 in Fig. 4.

The meter, as shown in Figs. 1, 2 and 3, comprises a casing including a pair of hollow members 10 and 11 having flanges 12 and 13, respectively, secured to opposite faces of a circular base 14. The base is made of a magnetizable material, such as iron or steel, and is provided with an opening 15 in which the neck of a metallic bellows 16 is secured. The bellows projects into the member 11 and communicates through the opening 15 in the base 14 with the interior of the member 10, so that the members 10 and 11, the base, and the bellows define a pair of expansible and contractible chambers 17 and 18.

At one side of the opening 15 is a passage 20 through the base, which connects the chambers and communicates with an inlet passage 21 extending inwardly from the periphery of the base. The inlet opening 21 may be threaded to receive a pipe for supplying a fluid to the meter. Between the inlet and the chambers 17 and 18 are valve seats 22 and 23, respectively, which are engaged alternately by a double headed valve 24 movable in perforated guides 25 and 26 secured to opposite faces of the base. The guides are made of a non-magnetic material, such as brass, and the guide 26 projects into the chamber 18 parallel to the bellows a substantial distance. The valve stem 24$^a$ extends through guide 26 and is supported by a disc 27 which engages the inner surface of the guide.

On the other side of the opening 15 is another passage 28 through the base, communicating with an outlet opening 29 which leads to a hollow boss 14$^a$ on the periphery of the base, the boss being threaded to receive a discharge pipe. Valve seats 30 and 31 are formed in the passage 28 between the outlet and the chambers 17 and 18, respectively, and are alternately engaged by a valve 32 slidable in a perforated guide 33 made of non-magnetic material. The valve 32 has a stem 32$^a$ extending into chamber 18 and connected by a bar 36 of non-magnetic material to the valve stem 24$^a$.

The valves 24 and 32 are normally held seated by magnetic means which may take various forms but which, as illustrated, comprises a bar magnet 37 connecting the valve stems 24$^a$, 32$^a$ on one side of the base, the magnet establishing a magnetic holding circuit through the valves, the seats with which they may be in contact, and the base. The valve structure consisting of the valves, their stems, and the bars 36 and 37 is alternately engaged to shift the valves from one pair of seats to the other by an actuating means operated by the bellows and comprising a rod 38 extending through the open end of the bellows and having caps 39 and 40, threaded on its ends. The cap 39 is formed with a reduced portion extending through a washer 41 and the end wall of the bellows, the end of the reduced portion being threaded to receive a clamping nut 42. A pin 43 slidable in cap 39 has an enlarged portion within a bore in the rod 38, the pin being urged outwardly by a coil spring 44 in the bore. A similar pin 45 is slidable in the other cap 40 and is formed with an enlargement engaged by a coil spring 44$^a$ within a bore in the rod. The end of the rod adjacent the base is supported by a pair of collars 46 secured to a shaft 47 and lying on opposite sides of the cap 40, each collar being secured to the cap by a pin 48 entering a recess in the cap.

With the parts in the position shown in Fig. 1, fluid entering through the inlet 21 passes through valve seat 22 into chamber 17 and expands the bellows, which then expels fluid from chamber 18 through valve seat 31 and the outlet 29. As the bellows expands, the pin 43 engages an adjustable screw 49 on the bar 36, but since the spring 44 is relatively weaker than the magnetic attraction acting to hold the valves 24 and 32 seated, the valves remain in place until the spring is compressed and the screw 49 is engaged by the end of cap 39. In its further movement, the bellows moves bar 36 to the right (Fig. 1) and forces the valves away from seats 23 and 30 against the force of the magnetic holding circuit. As soon as the valves move an appreciable distance from these seats, the magnet 37 exerts little force on the valves and the compressive force stored in the spring 44 is sufficient to force pin 43 outwardly and shift the valve mechanism quickly to the right so that the valves engage seats 22 and 31. When the valves engage the seats 22 and 31, another magnetic holding circuit is established through the bar 37, the valves, seats 22 and 31, and the base.

With the valves in their new positions, fluid flows from inlet 21 through valve seat 23 to chamber 18 and contracts the bellows, so that fluid in chamber 17 is forced out through seat 30 and outlet 29. When the bellows has moved sufficiently to cause pin 45 to engage bar 37, continued contraction of the bellows causes the pin to move inwardly and compress spring 44$^a$, until the end of cap 40 engages the bar 37. The bellows then moves the bar and the valves to the left so as to disengage the valves from the seats 22 and 31, whereby the magnetic holding circuit through the valves and the seats is broken and the valves are shifted to seats 23 and 30 with a snap action, as previously described.

In order that the meter may measure accurately, means are preferably provided for preventing air from being entrapped in the convolutions. For this purpose, a ring 16$^a$ of a material unaffected by the fluid is placed in each convolution. Rings of rubber or similar flexible material are preferred, since they may be easily placed in position, but since the rings do not require flexibility, once they are in position, they may be made of any desired material, so long as they can be introduced in proper position.

The amount of liquid entering and leaving the meter on each movement of the bellows depends on the diameter of the bellows and the length of its stroke, but fine adjustments may be made by varying the position of the screw 49. For this purpose, the casing member 11 is provided with an access opening normally closed by a threaded plug 11$^a$.

While the expansible and contractible chambers may be formed in other ways than by the use of a metallic bellows, I prefer to employ such bellows in the manner shown because it permits a simple and inexpensive construction. However, metallic bellows have an inherent resistance to expansion and contraction beyond their neutral position, which is the position a bellows assumes when it is free of external stress. This resistance of the bellows generally increases as the bellows is expanded or contracted from its neutral position, and in the meter illustrated such variations in resistance will result in corresponding variations in the pressure of the fluid discharged through outlet 29, unless suitable provision is made to counteract these variations. When it is desired to obtain a discharge of fluid from the meter at substantially constant pressure, I prefer to employ a device for counteracting the variations in the resistance of the bellows, and this device is operatively connected to the shaft 47 which is oscillated through an angle of about 90 deg. by expansion and contraction of the bellows.

The shaft 47 projects through a boss 50 on the periphery of the base 14 and its end lies within a hollow member 51 secured to the end of the boss. A cam 52 is secured to the shaft within the chamber and is engaged by a ball-bearing roller 53 mounted on an arm 54 pivoted on the boss 50. A coil spring 55 connected to the free end of arm 54 and to pin 56 on the base, urges the roller 53 against the periphery of cam 52. The cam is so shaped that the roller 53 exerts a torque on the shaft 47 just sufficient to overcome the inherent resistance of the bellows to expansion or contraction in any position of the bellows. As shown in Fig. 2, the bellows operates entirely on the compression side of its neutral position. Thus, the periphery of the cam slopes from a high point 52$^a$ to a low point 52$^b$, so that when bellows is compressed from the position shown, its neutral position, and turns the shaft 47 clockwise, the roller exerts a clockwise torque on the shaft of increasing magnitude sufficient to overcome the increased resistance of the bellows. As the bellows expands, it causes a counter-clockwise movement of shaft 47 which is opposed by roller 53, and the opposition of the roller to such movement is counteracted by the inherent tendency from the bellows to expand from its contracted position.

The end of the shaft 47 opposite cam 52 projects through a boss 60 on the base and extends through a flexible sleeve 61 which may be made of rubber, or the like. The sleeve 61 fits tightly over the boss 60 and is clamped thereto by an outer sleeve 62 having a flange 63 secured to the base. The outer end of the flexible sleeve 61 is held closely against an enlargement 64 of the shaft by a clamping ring 65 held by a nut 66 threaded on the shaft. The outer end of sleeve 62 is connected to the casing of a counting device 67 which may be locked in position by a lock nut 68. The counting device is operated by the shaft 47 to register the number of oscillations thereof and thus indicate the volume of fluid passing through the meter.

In operation, the new meter gives accurate measurements, since the valves are held securely against their seats at all times, except when they are shifted by the bellows. Also, since the magnetic holding force is rendered ineffective as soon as the valves are moved a slight distance from their seats, the springs 44 and 44$^a$ act quickly to complete the shifting of the valve mechanism almost as soon as the shifting movement is begun. The flexible sleeve 61 forms a simple but effective seal around the shaft 47 which prevents the escape of fluid along the shaft, and it is sufficiently long so that it is not strained by being twisted as the shaft oscillates.

The modified meter construction shown in Fig. 4 comprises a casing including hollow members 70 and 71 having flanges 72 and 73, respectively, secured to opposite sides of a non-magnetic base 74 which is formed with an opening 75 in which the neck of a bellows 76 is mounted, the bellows, the base and the members 70 and 71 defining a pair of expansible and contractible chambers 77 and 78.

An inlet opening 80 in the base communicates with a passage extending through the base between plates 81 and 81$^a$ secured to opposite sides of the base and forming seats for a double-headed valve 82. The valve is movable in non-magnetc guides 83 and 84 to engage the seats 81 and 81$^a$ in alternation, and the valve stem 82$^a$ is formed with an enlargement 85 which fits closely in the guide 84 to secure the valve against lateral displacement. Near the top of the base, an outlet opening 87 leads from a passage extending through the base between plates 88 and 88$^a$ forming seats for a valve 89 which is movable in a non-magnetic guide 90 to engage the seats in alternation. A bar 91 is connected between the valves in chamber 77 and has a resilient abutment 92 adjustable by means of a screw 92$^a$ threaded through the bar. The bar is moved back and forth to shift the valves by means of a rod 93 secured to the end wall of the bellows and extending through an opening in the bar, the rod having spaced shoulders 94 and 95 for alternately engaging the bar and the abutment 92. The valves 82, 89, the valve stems thereof, the valve seat plates 81, 81$^a$, 88, 88$^a$, and the bar 91 are all of magnetizable material.

The valves are normally held seated by magnetic means which, as illustrated, comprises a pair of bar magnets 96 mounted on each side of the base in contact with the plates 81, 81$^a$, 88 and 88$^a$, the plates and magnets being secured to the base by nuts and bolts 97 and 98 which are of magnetizable material and extend through the base. The magnets are so arranged that corresponding poles thereof engage the plates 81 and 81$^a$ and the opposite poles engage plates 88 and 88$^a$, whereby a magnetic holding circuit is established through the bar 91, the valves, the seats engaged thereby, and the bar magnets.

The operation of the valve mechanism is similar to that of the valve mechanism shown in Fig. 1 and will be readily understood. The neutral position of the bellows is at the center of its stroke and the bellows is expanded and contracted entirely by fluid pressure, no mechanism being provided to counteract its resistance. Accordingly, this form of meter is intended particularly for those uses where appreciable fluctuation of the pressure of the fluid discharged is not objectionable. The collars 94 and 95 alternately engage the bar 91 and the abutment 92 so as to unseat the valves against the attractive force of the magnets. As the valve members are disposed within the close-fitting, non-magnetic, cylindrical members, the unbalanced pressures of the fluid in the chambers act on the respective valve members after they have been unseated from one valve seat to complete their movement to a seated position on the opposite valve seat. The point in operation at which the bellows shifts the valves when the bellows is contracting may be varied by adjusting the abutment 92 by means of the screw 92$^a$ and this gives a fine adjustment of the device. Access may be had to the screw through an opening in the casing which is normally closed by a threaded plug 99. Filler rings 100, similar to the rings 16$^a$, may be disposed in the convolutions of the bellows to exclude air.

The expansions and contractions of the bellows are counted by means which includes a flexible diaphragm 102 forming a wall of the chamber 78 and clamped to the casing by a metal housing 103. The housing is provided with a bore 104 which is closed by an insulating member 105 threaded into the end of the bore and having a conducting member 106 extending therethrough. The member 106 forms a fixed contact cooperating with a movable contact carried by a pin 107 slidable in the housing and having an enlargement 107' in the bore. A coil spring 108 is disposed between the enlargement 107' and the member 105 and normally holds the contacts separated. Mounted on one side of the diaphragm and extending generally parallel thereto is an arm 109 engaging the pin 107 within the housing, and on the opposite side of the diaphragm is a similar arm 110 in position to be engaged by the end of the rod 93. The arms 109 and 110 may be connected to the central portion of the diaphragm by a rivet 111, one head of which is rounded and rests against an abutment 112 in the housing. The contact 106 is connected by a wire 113 to one terminal of an electric counting device 114, the other terminal of which is connected through a battery 115 to a screw 116 on the housing.

In operation, the rod 93 engages arm 110 once during each expansion and contraction cycle of the meter and exerts on the arm a force which is eccentric with respect to the bearing point of abutment 112 and rivet 111. Accordingly, the upper end of the arm is moved to the right on the rivet-head as a pivot so that the one side of the diaphragm is deflected outwardly and the other side is deflected inwardly. This movement of the arm 110 causes the upper end of arm 109 to move to the right (Fig. 4) and close the contacts, whereby a circuit is established through the terminal 106, the counting device, the source of power, and the housing. When the bellows contracts and moves rod 93 away from arm 110, the spring 108 disengages pin 106 from the fixed contact and opens the circuit. The counting device is thus operated once during each cycle of the meter. Since the movement of the arms 109 and 110 results in an outward movement of part of the diaphragm and a simultaneous inward movement of another part of the diaphragm, the volume of the measuring chamber 78 is substantially unaffected. Also, since the contacts are fully enclosed in the bore 104 and separated from the measuring chambers, there is no danger of ignition or explosion of the fluid due to sparking if a crack should develop in the diaphragm.

I claim:

1. In a fluid meter, a casing, a bellows therein subdividing the casing into a pair of expansible and contractible chambers, the casing having an inlet opening and a pair of valve seats between the inlet opening and the chambers, respectively, and also having an outlet opening and a pair of valve seats between the outlet opening and the chambers, respectively, a valve member for each pair of seats, a connection between the valve members beyond each end of the bellows, and means movable with the bellows for alternately engaging said connections to move each valve member from one of its seats toward the other, the valve members being operable to connect the inlet opening to one of the chambers and the outlet opening to the other chamber and then connect the inlet opening to said last chamber and the outlet opening to the first chamber.

2. In a fluid meter, a casing, a bellows therein subdividing the casing into a pair of expansible and contractible chambers, the casing having an inlet opening and a pair of valve seats between the inlet opening and the chambers, respectively, and also having an outlet opening and a pair of valve seats between the outlet opening and the chambers, respectively, a valve member for each pair of seats, a connection between the valve members beyond each end of the bellows, a pair of slidable elements engageable with said connections, respectively, and spring means compressible by each of said elements under action of the bellows when said element is engaged with its corresponding connection, said spring means being operable when compressed to shift each valve member from one of its seats to the other with a snap action.

3. In a fluid meter, a casing, a bellows therein subdividing the casing into a pair of expansible and contractible chambers, a valve mechanism by which fluid is admitted into one of the chambers and discharged from the other and then admitted into the second chamber and discharged from the first, whereby the bellows is alternately expanded and contracted, means operable upon a predetermined expansion of the bellows for moving the valve mechanism, a shaft operatively connected to the bellows and rotatable thereby, a cam on the shaft, a roller engaging the cam, and means normally urging the roller against the cam, whereby the roller exerts a varying torque on the rotating shaft and counteracts the variations in the inherent resistance of the bellows to expansion and contraction.

4. In a fluid meter, a casing, a bellows therein subdividing the casing into a pair of expansible and contractible chambers, the casing having an inlet opening and a pair of valve seats between the inlet opening and the chambers, respectively, and also having an outlet opening and a pair of valve seats between the outlet opening and the chambers, respectively, a valve member for each pair of seats, means connecting the valve members and said pairs of seats, respectively, and completing a magnetic holding circuit through the valve members and the seats engaged thereby, and means operable by the bellows for exerting a counterforce on the valve members to overcome the holding force of the magnetic circuit and move said members toward the other seats.

5. In a fluid meter, a pair of expansible and contractible chambers having a movable wall, a valve mechanism by which fluid is admitted into one of the chambers and discharged from the other and then admitted into the second chamber and discharged from the first, said mechanism being actuated by movement of said wall and including a pair of valve seats through which fluid passes into the chambers and a second pair of valve seats through which fluid is discharged from the chambers, and a valve member coacting with each pair of seats and movable from one seat to the other, the valve members and their seats being made of magnetizable material, and means for establishing a magnetic circuit through each valve member and the seat with which it is in contact.

6. In a fluid meter, a pair of expansible and contractible chambers, a valve mechanism by which fluid is admitted into one of the chambers and discharged from the other and then admitted into the second chamber and discharged from the first, said mechanism including a pair of valve seats through which fluid passes into the chambers and a second pair of valve seats through which fluid is discharged from the chambers, and a valve member coacting with each pair of seats and movable from one seat to the other, said valve members and seats being of magnetizable material and forming part of a magnetic circuit, magnetic means for completing said circuit and normally holding the valve members seated, and means operable upon a predetermined expansion of each of said chambers for exerting a counterforce on said valve members to overcome the force of the magnetic means and move the valve members toward the other seats.

7. In a fluid meter, a pair of expansible and contractible chambers, a valve mechanism by which fluid is admitted into one of the chambers and discharged from the other and then admitted into the second chamber and discharged from the first, said mechanism including a pair of valve seats through which fluid passes into the chambers and a second pair of valve seats through which fluid is discharged from the chambers, and a valve member coacting with each pair of seats and movable from one seat to the other, said valve members and seats being of magnetizable material, magnetic means connected at one pole to one pair of said seats and at the opposite pole to the other pair of seats, a connection between said valve members for completing a magnetic holding circuit through the valve members and the seats engaged thereby, and means operable upon a predetermined expansion of each of said chambers for exerting a counterforce on the valve members to overcome the holding force of said circuit and move the valve members toward the other seats.

8. In a fluid meter, a pair of expansible and contractible chambers, a valve mechanism by which fluid is admitted into one of the chambers and discharged from the other and then admitted into the second chamber and discharged from the first, said mechanism including a pair of valve seats through which fluid passes into the chambers and a second pair of valve seats through which fluid is discharged from the chambers, and a valve member coacting with each pair of seats and movable from one seat to the other, said valve members and seats being of magnetizable material, magnetic means connected at one pole to one of said valve members and at the opposite pole to the other valve member, a connection between said pairs of seats for completing a magnetic holding circuit through the valve members and the seats engaged thereby, and means operable upon a predetermined expansion of each of said chambers for exerting a counterforce on the valve members to overcome the holding force of said circuit and move the valve members toward the other seats.

9. In a fluid meter, a base, expansible and contractible chambers separated in part by the base, the base having a pair of passages connecting the chambers and an inlet leading to one of the passages and an outlet leading from the other passage, the base also having a pair of valve seats between the inlet and said chambers, respectively, and a pair of valve seats between the outlet and said chambers, respectively, a valve member extending through each of the passages and movable from one seat to the other, magnetic means connected between the valve members for establishing a magnetic holding circuit through said members, the seats engaged thereby, and the base, and means operable upon a predetermined expansion of each of the chambers for exerting a counterforce on the valve members to overcome the holding force of the magnetic circuit and move said members toward the other seats.

10. In a fluid meter, a base, expansible and contractible chambers separated in part by the base, the base having a pair of passages connecting the chambers and an inlet leading to one of the passages and an outlet leading from the other passage, the base also having a pair of valve seats between the inlet and said chambers, respectively, and a pair of valve seats between the outlet and said chambers, respectively, a valve member extending through each of the passages and movable from one seat to the other, magnetic means on the base connected at one pole to one of said pairs of seats and at the opposite pole to the other pair of seats, a connection between the valve members for completing a magnetic holding circuit through said members, the seats engaged thereby, and the magnetic means, and means operable upon a predetermined expansion of each of the chambers for exerting a counterforce on the valve members to overcome the holding force of the magnetic circuit and move said members toward the other seats.

11. In a fluid meter, a base, expansible and contractible chambers separated in part by the base, the base having a pair of passages connecting the chambers and having an inlet opening leading to one of the passages and an outlet opening leading from the other passage, a pair of plates on the base at opposite ends of each passage and forming valve seats between said inlet and the chambers, respectively, and between said outlet and the chambers, respectively, a valve member extending through each of the passages and movable from one seat to the other, magnetic means connected at one pole to one pair of plates and at the opposite pole to the other pair of plates, a connection between the valve members for completing a magnetic holding circuit through said magnetic means, the valve members and the seats engaged thereby, and means operable upon a predetermined expansion of each of the chambers for exerting a counterforce on the valves to overcome the holding force of the magnetic circuit and move the valves toward the other seats.

12. In a metering device, a casing having a pair of expansible and contractible chambers therein, a valve mechanism operable in one position to admit fluid into one of the chambers and discharge fluid from the other and operable in another position to admit fluid into the second chamber and discharge fluid from the first, means operable upon a predetermined expansion of each of said chambers for moving the valve mechanism from one position toward the other, a shaft in the housing operatively connected to one of the chamber walls and rotatable thereby as the chamber expands and contracts, the casing having a hollow boss on the outside thereof through which the shaft projects, a flexible sleeve of imperforate material surrounding the shaft outside the casing, a substantially rigid sleeve secured to the casing concentric with and outside said flexible sleeve, and securing one end of said flexible sleeve to the boss, means for securing the other end of said flexible sleeve to a part of the shaft spaced from the boss, the flexible sleeve forming a seal around the shaft outside the boss, and a counting device mounted on said rigid sleeve and operatively connected to the shaft.

13. In a metering device, a casing having a pair of expansible and contractible chambers therein and inlet and outlet ports, a valve member in the casing having a pair of interconnected discs, a pair of valve seats between the discs engageable alternately by the valve member for admitting fluid from the inlet port into one chamber and then the other, a second valve member including a disc, valve seats at opposite sides of said last disc and engageable alternately thereby for admitting fluid to the outlet port from said last chamber and then the first chamber, means for holding the valve members against the seats engaged thereby, means operating when the expansible and contractible chambers reach predetermined volumes to unseat the valve members, and means consisting of close-fitting cylindrical members in which the valve discs are slidably mounted for enabling the unbalanced pressures of the fluid in the chambers acting on the unseated valve members to complete their movements to their opposite positions.

14. In a metering device, a casing having a pair of expansible and contractible chambers therein and inlet and outlet ports, a valve member in the casing having a pair of interconnected discs, a pair of valve seats between the discs engageable alternately by the valve member for admitting fluid from the inlet port into one chamber and then the other, a second valve member including a disc, valve seats at opposite sides of said last disc and engageable alternately thereby for admitting fluid to the outlet port from said last chamber and then the first chamber, magnetic means for holding the valve members against the seats engaged thereby, means operating when the expansible and contractible chambers reach predetermined volumes to unseat the valve members, and means consisting of close-fitting cylindrical members in which the valve discs are slidably mounted for enabling the unbalanced pressures of the fluid in the chambers acting on the unseated valve members to complete their movement to their opposite positions.

ALLEN W. REID.